Figure 1:
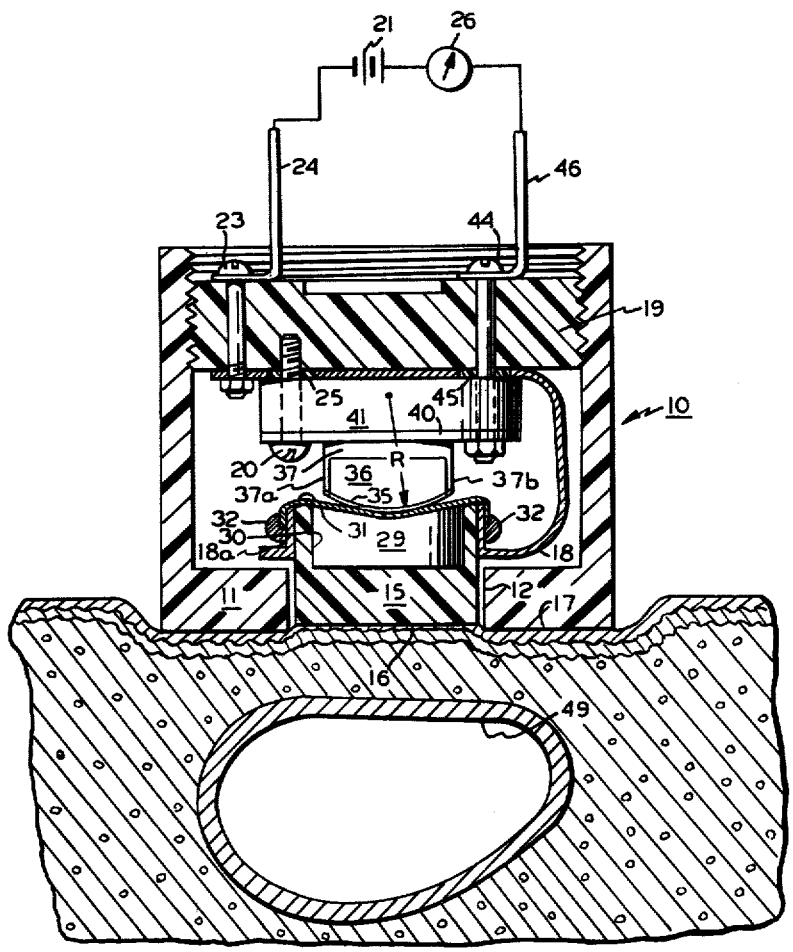

Sept. 3, 1963 R. P. BIGLIANO ET AL 3,102,534
PHYSIOLOGIC FLUID PRESSURE MEASURING APPARATUS
Filed June 21, 1962 2 Sheets-Sheet 1

INVENTORS
ROBERT P. BIGLIANO
GERHARDT E. MEYER
ROLLIN D. MORSE

BY Harry J. McCauley

ATTORNEY

United States Patent Office 3,102,534
Patented Sept. 3, 1963

3,102,534
PHYSIOLOGIC FLUID PRESSURE MEASURING
APPARATUS
Robert P. Bigliano and Gerhardt E. Meyer, Wilmington, Del., and Rollin D. Morse, New London, Pa., assignors to E. I. du Pont de Nemours and Company, Wilmington, Del., a corporation of Delaware
Filed June 21, 1962, Ser. No. 204,243
3 Claims. (Cl. 128—2.05)

This invention relates to a physiologic fluid pressure measuring apparatus, and particularly to such an apparatus utilizing a single sensing head.

There is a very great need for reliable and convenient apparatus to measure blood pressures, both venous and arterial, as well as other physiologic body fluid pressures, such as those accompanying the existence of glaucoma eye disease, and the like, for use on both human beings and test animals. Such apparatus is required not only in the swiftly growing fields of medical research but also as an aid in day-to-day medical treatment.

In U.S. application S.N. 143,124 filed October 5, 1961, there was disclosed a dual head sensing device which eliminates the error-introducing, co-existing compressive effect of body tissues surrounding a blood vessel during blood pressure measurements. That apparatus utilized counterbalancing sensing heads for body tissue and blood vessel, respectively.

Also, in U.S. application S.N. 204,244, filed of even date herewith, there is disclosed a physiologic fluid pressure single sensing head apparatus employing the developed pressure of a flowing gas as the pressure detection agency. A single head pressure-sensing device, employing a protuberant probe and developing a signal in measurement of pressure as a function of the electrical resistance developed through compressed carbon granules, is shown in U.S. Patent 747,157 and, more recently, a flush probe tonometer has been described in Science, volume 131, dated June 1960.

We have now conceived an improved single head type physiologic fluid pressure measuring apparatus of extremely high accuracy which dispenses with a flowing gas, thereby obviating the need for a pressurized gas supply and the associated supply tubing and auxiliaries.

Figure 1A:
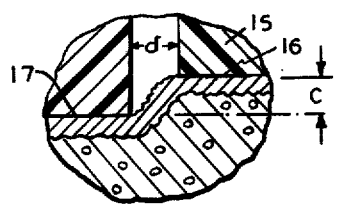
Figure 3:
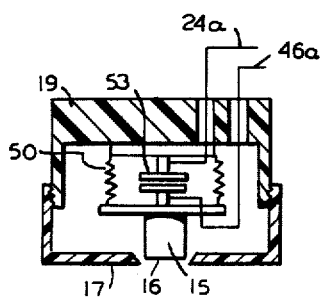
Figure 4:
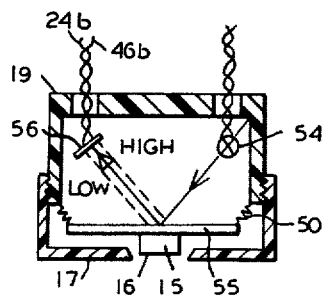
Figure 5:
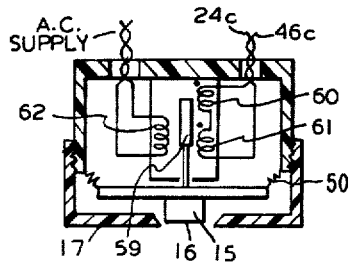
Figure 6:
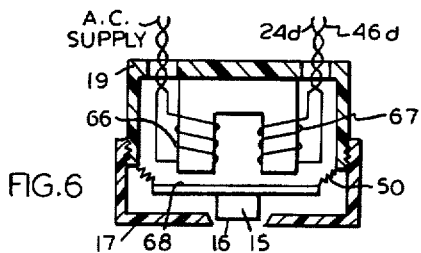

An object of this invention is to provide an improved physiologic fluid pressure measuring apparatus which is very compact and small in mass, simple in design, cheap in first cost and maintenance, and so rugged as to permit its use under sereve conditions, such as during space flights and in the course of similar activities. Other objects of this invention include the provision of a physiologic fluid pressure measuring apparatus which is relatively comfortable to the patient or test subject, convenient to use, and one which either requires no calibration or, alternatively, is very readily calibrated. The manner in which these and other objects of this invention are attained will become clear from the following detailed description, and the drawings, in which:

FIG. 1 is a partially schematic sectional view of a preferred embodiment of apparatus employing variable electrical resistance pressure measurement, shown with sensing head applied in measuring position upon a body member, FIG. 1A is an enlarged detailed fragmentary view of one edge of the pressure-deflectible foot of the apparatus of FIG. 1 mounted within the aperture of the elastic body membrane depressor element, showing more clearly the typical non-variant intrusion of underlying body flesh into the aperture, FIG. 3 is an inverted exploded somewhat schematic view of the co-operating electrical resistance varying components of the apparatus of FIGS. 1 and 1A, with the back side of the pressure-deflectible foot partly cut away to better show the details, and FIGS. 3-6 are schematic sectional views of other embodiments of apparatus according to this invention, FIG. 3 depicting a variable electrical capacitance measurement device, FIG. 4 a photoelectric light-reflective measurement device, FIG. 5 a differential electrical transformer measurement device, and FIG. 6 a variant magnetic reluctance measurement device.

Generally, the apparatus of this invention comprises, in combination, a rigid apertured elastic body membrane depressor element provided with an elastic body membrane-depressing face having a surface generally conforming to that of the undepressed flesh to which the depressor element is to be applied, a rigid pressure-deflectible foot slidably mounted for free movement within the aperture in the depressor element back of the elastic membrane-depressing face and with the forward face of the foot disposed inwardly from the closest point on the elastic body membrane-depressing face adjacent the foot a distance substantially equal to the non-variant distance flesh underlying the aperture intrudes into the aperture under the pressure with which the depressor element depresses the elastic body membrane during the measurement of the physiologic fluid pressure, and means measuring the physiologic fluid pressure as a function of the displacement of the foot when the depressor element is made to depress the elastic body membrane without occlusion of physiologic fluid passage therepast.

Referring to the figures, an apparatus constructed according to this invention for the measurement of blood pressure especially comprises a single pressure-sensing head, preferably fabricated from a high molecular weight polymer, indicated generally at 10, provided with a rigid, flat-faced, apertured elastic body membrane depressor element 11, the aperture within which can conveniently be a circular bore 12.

Mounted within aperture 12, for limited free sliding movement axially thereof, is a rigid pressure-deflectible foot 15, the forward face 16 of which, in normal out-of-service condition, is retracted slightly inwards from the plane of the elastic body membrane-contacting face 17 of depressor element 11. In the design of FIGS. 1 and 1A, foot 15 is suspended in position by friction-fit attachment within collar 18a formed on the lower end of light spring metal strap 18. The other end of strap 18 is fixedly attached to adjustable screw cap 19, constituting the back wall of head 10, by retention screw 20. Since strap 18 constitutes part of the electrical circuit of the apparatus, it is extended on the end adjacent cap 19 to provide a length for screw 23 attachment to one of the output signal leads 24, and the drilled hole in the strap receiving retention screw 20 is fitted with an electrical insulation washer 25.

The rear side of foot 15 is drilled with a blind bore 29 to form an upstanding rim 30 across which is disposed, generally diametrically thereof, a thin, elastic electrically conductive shunting strip 31, which can typically be a metal foil one mil thick x $\frac{1}{64}$" wide, or a length of metallized polymer, such as polyethylene terephthalate, for example, overlaid, at least on the top face, with vapor-deposited or cement-adhered fine particulate metal. It is especially preferred that this metal surface be one developing no oxide film with the passage of time which would reduce the electrical conductivity, gold and platinum being particularly good materials in this respect.

As will be seen most clearly in FIG. 2, strip 31 is stretched rather tautly across rim 30 and tends to maintain its straight line course even when biased out of it by contact with opposed arched resistive ribbon 35, hereinafter described, in the fully assembled apparatus shown in FIG. 1. Strip 31 is retained in taut condition by attachment of the ends to collar 18a, using an electrically conductive cement 32, which thus insures good electrical contact with the metal of strap 18.

Confronting strip 31, and in constant contact therewith along face 35a in the assembled apparatus, is a thin elongated strip of electrically resistive material 35, which, in a typical case, consisted of a flour-fine layer of particulate graphite, dusted thickly on an adhesive base before the latter had hardened completely from its tacky state. The composite strip 35 measured about 0.5 mil thick x 0.010″ wide x 0.125″ long (projected length to the horizontal plane) and was given a fixed convex arcuate shape conforming to the peripheral area of a cylinder bounded by planes normal to the longitudinal axis thereof by attachment to a cylindrically curved insulating base 36. For best results, the radius of development, R (FIG. 1), of the ribbon support face of base 36 should be one hundred or more times the maximum permissible deflection of an artery wall, i.e., that deflection which will not introduce spurious factors in blood pressure readings resulting from changes in curvature of the artery wall. We have found that a deflection of about 0.001″ is permissible at the artery surface, whereupon a practical radius R can be 2″ or greater.

It is, moreover, desirable to minimize the electrical contact resistance at the juncture of conductive strip 31 and resistive ribbon 35, and this is readily accomplished by a carefully applied coating of fine particulate evaporated platinum, or a similar metallic conductor, upon the graphite particles of ribbon 35. The platinum particles must not touch one another to any significant extent, because they would then short out regions of resistive ribbon 35 underlying them, yet they must provide a firm, low resistance contact point against which conductive strip 31 bears as it is bowed responsive to the physiologic fluid pressures which it is desired to measure. Conventional techniques useful in the preparation of conductive strips for printed circuit electronics, or selective etching to remove excessive bridging conductive metal, are both effective in creating a satisfactorily uniform discontinuous metallic contact surface over the length of ribbon 35.

The lower part of base 36 is enlarged into a disk 36a which is encircled by a metal collar 37, provided with elongated connecting lugs 37a and 37b which are attached in firm electrical contact with the opposite ends of ribbon 35. The electrical circuit with ribbon 35 is completed via a metal disk 40 silver-soldered to the outside periphery of collar 37, and the subassembly inclusive of ribbon 35 electrically isolated from cap 19 by insulation disk 41, which can conveniently be of the same polymeric composition as head 10. For rigidity in construction, the upper end of strap 18 is sandwiched between disk 41 and the underside of cap 19 and the same retention screw 20 employed to also attach the resistive ribbon 35 and its base to the cap. Finally, the electrical signal connection to ribbon 35 is made via screw 44, insulated from strap 18 by insulation washer 45, and the remaining signal lead 46.

A typical blood pressure-measuring apparatus of the design hereinbefore described employed a cylindrical head 10 of diameter 0.470″, height 0.420″, provided with a foot 15 of 0.188″ diameter and an aperture 12 of 0.192″ diameter.

The operation of the apparatus of this invention will be clear from FIGS. 1 and 1A, which concern blood pressure measurement particularly, the most common body fluid pressure which has to be measured in current medical practice. In this use, pressure-deflectible foot 15 must be somewhat smaller in transverse dimension than the projected width of the blood vessel 49 when the latter is flattened to measuring condition by application of head 10 against the flesh overlying the blood vessel. The degree of vessel flattening is not particularly critical, but can typically be of the order of about 20% of the diameter in normal uncompressed condition, i.e., so that the blood vessel wall beneath foot 15, and somewhat to either side of it, is flattened into a substantially common horizontal plane without, however, occlusion of blood flow through the vessel.

The interference to measurement caused by the counter pressure exerted against the blood vessel by neighboring compressed body tissue is largely prevented by depressor element 11, which extends the compressed area peripherally outwards from foot 15 a substantial additional distance, as, typically, one radius or more beyond for the apparatus with the 0.188″ diameter foot hereinbefore detailed. However, it is, of course, necessary to provide enough radial clearance d (FIG. 1A) between foot 15 and aperture 12 to insure free movement of foot 15 responsive to the blood pressure in measurement. The intrusion of flesh into this clearance is indicated at c, and it is clear that the annulus of flesh of projected width d thrusting inwardly of face 17 is possessed of a definite resultant force component which detracts from the fluid pressure imposed normally of the face of foot 15 and introduces error into the determination unless taken account of. Accordingly, foot 15 is mounted with a predetermined retraction substantially equal to c, i.e., the non-variant intrusion of flesh into aperture 12 which, generally, approximate d closely. The flesh intrusion described is quite constant in amount among different persons, even though soft tender skin usually intrudes somewhat farther into a clearance than stiffer, drier skin. This retraction is most conveniently obtained by advancement or retraction of screw cap 19 an appropriate amount so that support spring 18, or the corresponding bellows supports 50 for the feet in the embodiments of FIGS. 3–6, inclusive, will compensate for the flesh intrusion. An extremely accurate way of establishing this setting is to mount the head in measuring position over the skin covering a real artery within which a catheter is implanted nearly and then screwing cap 19 into or out of the body of head 10 until the measured value of blood pressure coincides exactly with that signaled by the catheter. It has been found that the critical extent of retraction required for a given apparatus is dependent almost entirely on its own physical dimensions, as distinguished from the properties of the flesh of individuals, so that a device, once preset in this regard, is not limited in applicability to the person with whom the initial setting was established.

Body fluid pressure is measured with this embodiment of the invention by a very precise and reproducible shunting out of electrical resistance contributed to the circuit by arched resistive ribbon 35 under the successive bowed positions of conductive strip 31 in contact therewith. Thus, if a voltage source 21 of, typically, 9 volts, is applied across leads 24 and 46, and a microammeter 26 is connected in series therewith, the conductance of the shunted resistive ribbon 35 varies with the transient body fluid pressure applied to foot 15 in accordance with the corresponding position which conductive strip 31 assumes with respect to ribbon 35 responsive to the movement of foot 15. An essentially linear relationship exists between body fluid pressure and foot 15 position as a function of ribbon 35 conductance, due to the relatively large radius cylindrically arched curve of ribbon 35 in relationship to the shunting effected by strip 31. This characteristic has been confirmed by the calibration of an apparatus constructed according to this invention, wherein a head 10 was clamped face downward in space over a balance pan in which was stood a rigid pyramid, the peak of which was placed in contact with the face 16 of foot 15. When progressively larger weights were added to the other pan of the balance, corresponding changes in electrical conductance occurred for ribbon 35, so that electrical response could be plotted against force loading. Knowing the cross-sectional area of face 16, the force loading was divided by this area to give a correlation in terms of pressure applied to foot 15.

The conductance range for a typical apparatus according to this invention measuring the blood pressure of a healthy human being displaying a diastolic pressure of 70 mm. Hg and a systolic pressure of 130 mm. Hg was between the limits 10 and 20 microamperes, respectively, which constituted a good span for the purpose. In this test the measurements were made on the radial artery of the wrist, by application of the sensor head 10 to the external surface of the skin, although, of course, the design is equally adapted to direct application to blood vessels laid bore surgically, as is sometimes the practice in medical research activity.

It will be understood that the arrangement of components 31 and 35 can be equally well reversed, with resistive ribbon 35 then mounted on foot 15 and conductive strip 31 carried by screw cap 19. Many other modifications in design are, of course, also feasible.

Turning now to the embodiments of FIGS. 3 to 6, these utilize sensing heads 10 and body pressure-deflectible feet 15 in all respects identical with those of the embodiment of FIGS. 1 and 1A. However, the feet 15 are, with these designs, supported from suitable bellows 50. Accordingly, movement of the foot 15 is accommodated by the bellows, and this permits the relative movement of components upon which measurement is based.

Thus, the embodiment of FIG. 3 employs a variable capacitor 53, one plate of which is carried by the back side of foot 15 whereas the other is fixedly attached to the inside of screw cap 19. Accordingly, when foot 15 is moved responsive to body fluid pressure applied to its face 16 in contact with the body region in which the pressure exists, the electrical capacitance displayed by the plate pair varies correspondingly and the resultant electrical signal obtained via leads 24a and 46a constitutes a direct measure of the body fluid pressure.

The embodiment of FIG. 4 is photoelectric in its operation, incorporating a small light source 54 masked by a light-impenetrable shield not detailed in the drawing, which directs light along the course indicated by arrow head to a mirror 55 mounted on the back side of foot 15. The reflected light then passes to a conventional photoelectric detector 56, which can be a silicon cell or the equivalent, masked by a light-impenetrable shield (not detailed), so that the amount of light incident thereon is a function of the position of foot 15 in the course of its deflection responsive to body fluid pressure imposed on face 16. The electrical signal generated by detector 56 is then drawn from output leads 24b and 46b as a measure of the body fluid pressure.

The embodiment of FIG. 5 employs an A.-C. powered differential transformer pickup, in which foot 15 is provided on the back side with a magnetically permeable slug 59 mounted in prolongation therewith, which moves between a primary coil 62 and a pair of oppositely wound secondary transformer coils 60 and 61 affixed to cap 19. This induces a characteristic signal in the secondary coils, which is a function of the extent of travel of slug 59 out of null position as it shifts with the movement of bellows 50 as foot 15 is displaced responsive to the variation of body fluid pressure in measurement, the signal being withdrawn through leads 24c and 46c.

The embodiment of FIG. 6 is also A.-C. powered, employing a stationary bipolar magnetic circuit with generally horseshoe, permeable core 65 affixed to cap 19, upon one leg of which is wound an A.-C. powered coil 66 and upon the other the pickup coil 67. The reluctance of the gap of core 65 is varied by a magnetically permeable strip 68 carried on the back side of foot 15, so that the signal withdrawn via leads 24d and 46d is again a function of the advance or retraction of bellows 50 responsive to the variation of body fluid pressure in measurement as transmitted through foot 15.

It is practicable to use a sensing head having perfectly flat depressing face 17 in most instances, especially where blood pressure is the measurement sought and where relatively small-dimensioned sensing heads are employed. However, broadly, all of the advantages of this invention are obtainable with designs of sensing heads wherein the membrane-depressing face 17 is provided with a surface generally conforming to that of the undepressed flesh to which the depressor element is applied during a measurement. Thus, for tonometers measuring the fluid pressure existing within the eyeball, it is preferred to use a relatively large-sized head 10 having a depressing face covering a relatively large area of the eyeball and, in this case, a concave face 17 conforming generally to the undepressed eyeball surface is preferred.

From the foregoing, it will be apparent that this invention can be modified in numerous respects without departure from its essential spirit, and it is intended to be limited only within the scope of the appended claims.

What is claimed:

1. An apparatus for the measurement of physiologic fluid pressure existing behind an elastic body membrane comprising, in combination, a rigid apertured elastic body membrane depressor element provided with an elastic body membrane-depressing face having a surface generally conforming to that of the undepressed flesh to which said depressor element is to be applied, a rigid pressure-deflectible foot slidably mounted for free movement within the aperture in said depressor element back of said elastic body membrane-depressing face and with the forward face of said foot disposed inwardly from the closest point on said elastic body membrane-depressing face adjacent said foot a distance substantially equal to the non-variant distance flesh underlying said aperture intrudes into said aperture under the pressure with which said depressor element depresses said elastic body membrane during said measurement of said physiologic fluid pressure, and means measuring said physiologic fluid pressure as a function of the displacement of said foot when said depressor element is made to depress said elastic body membrane without occlusion of physiologic fluid passage therepast.

2. An apparatus for the measurement of physiologic fluid pressure existing behind an elastic body membrane according to claim 1 wherein said means measuring said physiologic fluid pressure as a function of the displacement of said foot comprises an electrical resistance varied in magnitude responsive to the displacement of said foot when said depressor element is made to depress said elastic body membrane without occlusion of physiologic fluid passage therepast.

3. An apparatus for the measurement of physiologic fluid pressure existing behind an elastic body membrane according to claim 1 wherein said means measuring said physiologic fluid pressure as a function of the displacement of said foot comprises an electrical circuit provided with a current source, a current-measuring device and a convexly disposed elongated resistor in contact with a taut elastic conductive shunting strip, wherein said conductive strip is mounted for relative movement with respect to said resistor so as to shunt out a predetermined length of said resistor as a linear function of the displacement of said foot when said depressor element is made to depress said elastic body membrane without occlusion of physiologic fluid passage therepast.

References Cited in the file of this patent

UNITED STATES PATENTS

| | | |
|---|---|---|
| 2,478,372 | Colegrave | Aug. 9, 1949 |
| 2,960,086 | Keller | Nov. 15, 1960 |
| 3,032,030 | Han | May 1, 1962 |
| 3,049,001 | Mackay | Aug. 14, 1962 |

UNITED STATES PATENT OFFICE
CERTIFICATE OF CORRECTION

Patent No. 3,102,534 September 3, 1963

Robert P. Bigliano et al.

It is hereby certified that error appears in the above numbered patent requiring correction and that the said Letters Patent should read as corrected below.

Figure 2:
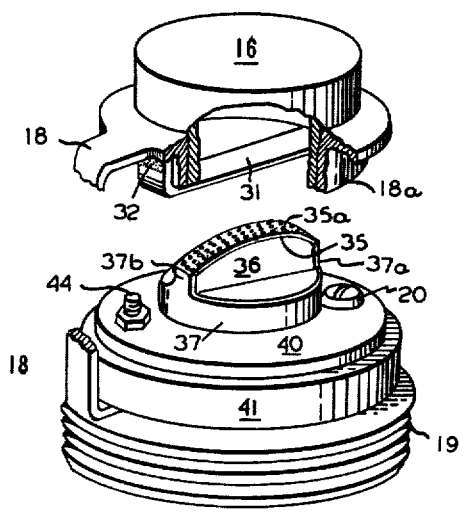

Column 1, line 70, for "FIG. 3" read -- FIG. 2 --; column 2, line 8, for "variant" read -- variable --; column 4, line 38, for "nearly" read -- nearby --; column 5, line 11, for "bore" read -- bare --.

Signed and sealed this 31st day of March 1964.

(SEAL)
Attest:
ERNEST W. SWIDER

Attesting Officer

EDWARD J. BRENNER

Commissioner of Patents